May 5, 1964 R. H. ELLIOTT 3,131,578
LOCKING DIFFERENTIAL
Filed Sept. 2, 1960 7 Sheets-Sheet 2
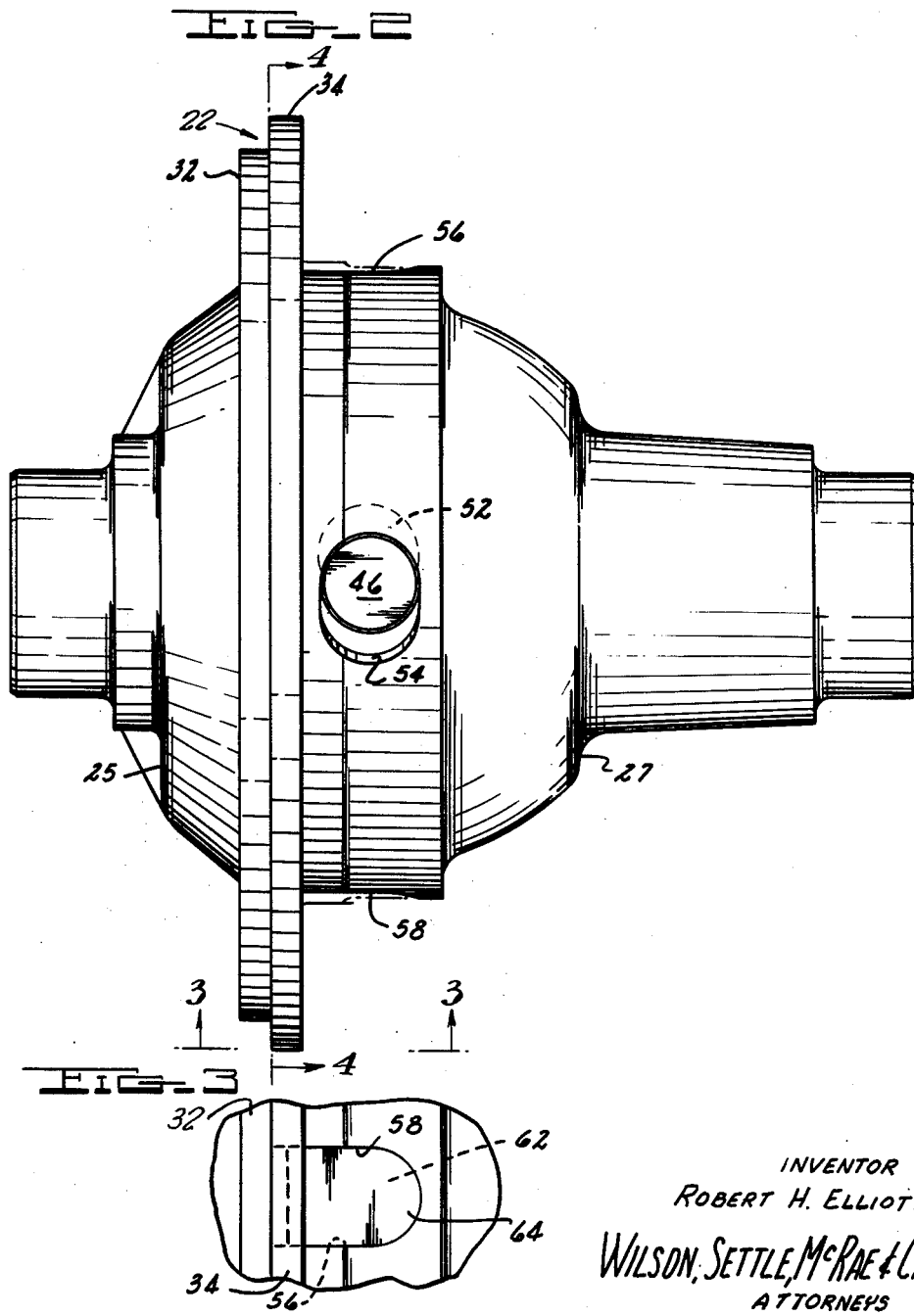
INVENTOR
ROBERT H. ELLIOTT
WILSON, SETTLE, McRAE & CRAIG
ATTORNEYS

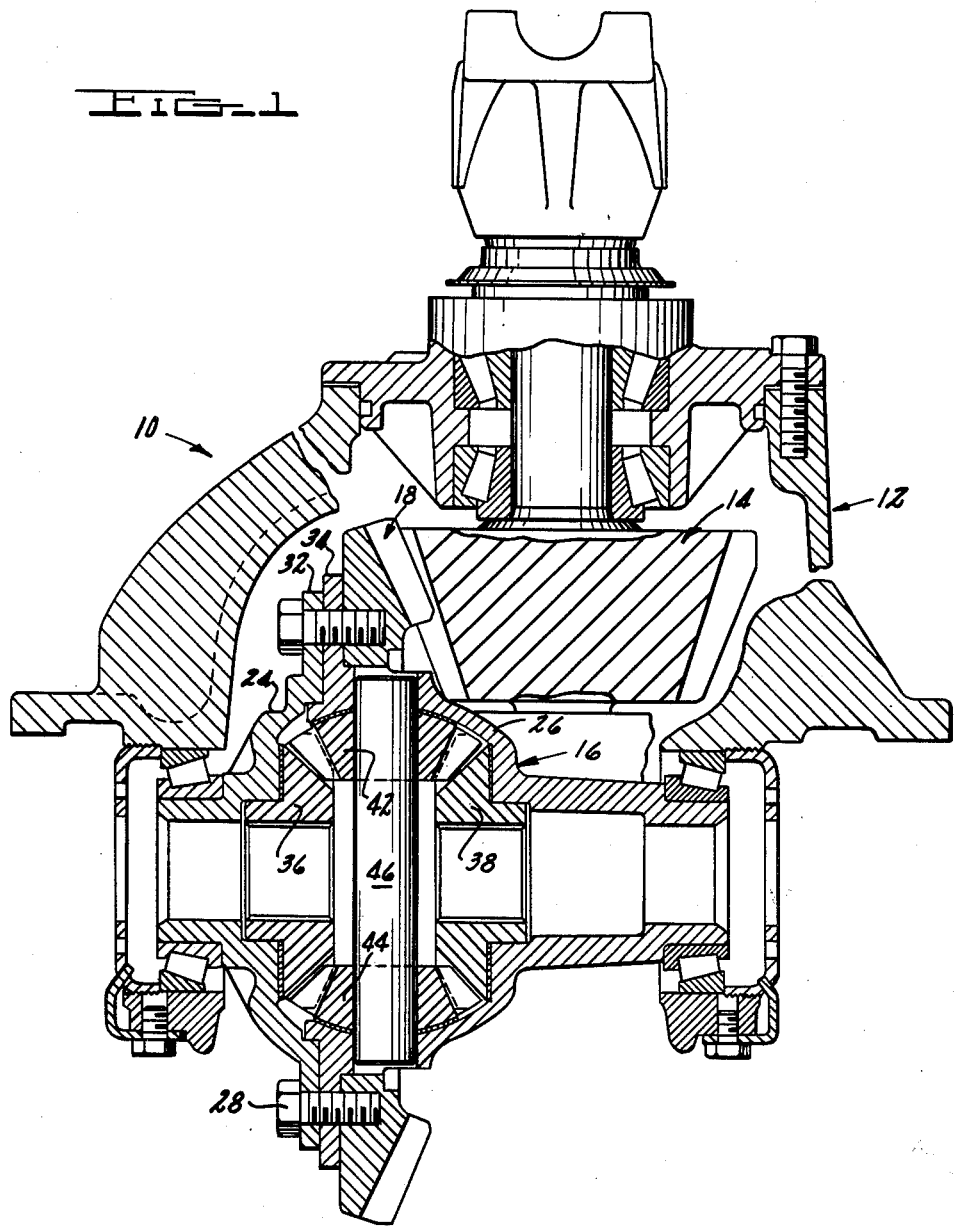

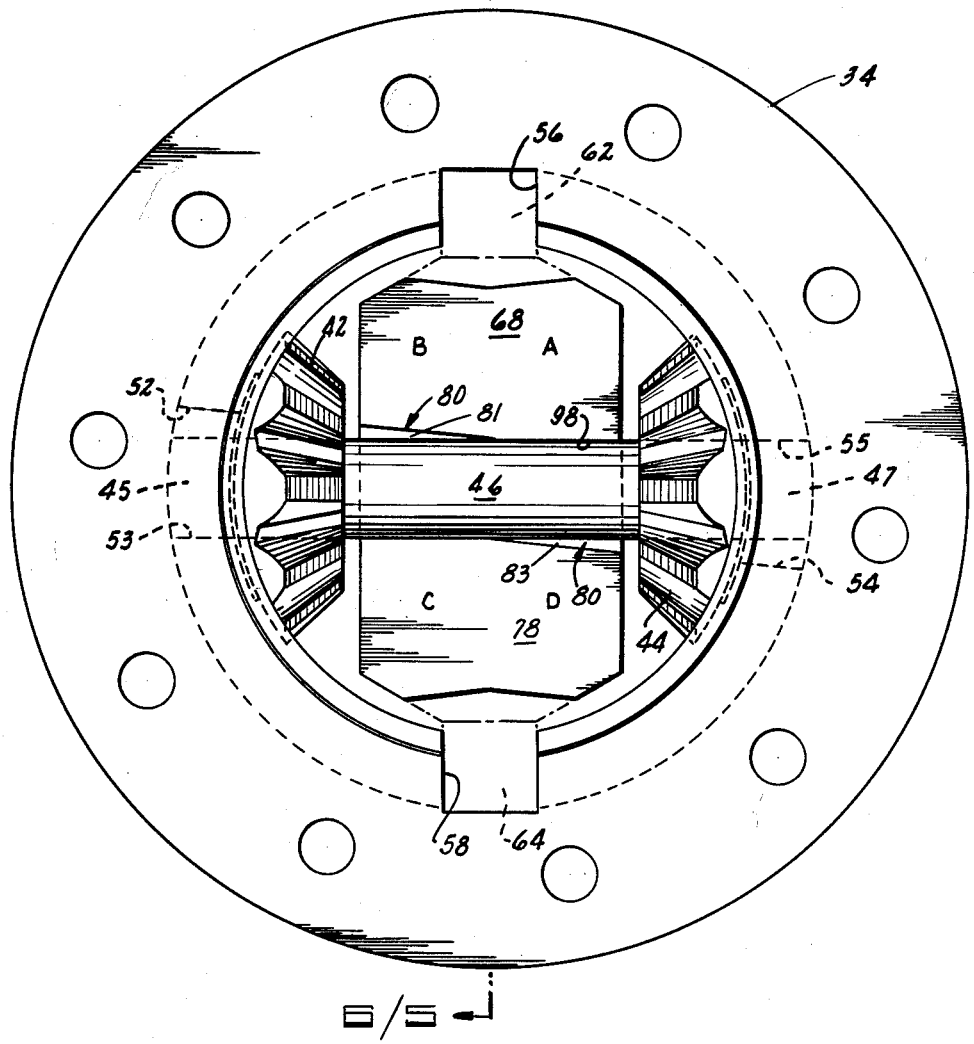

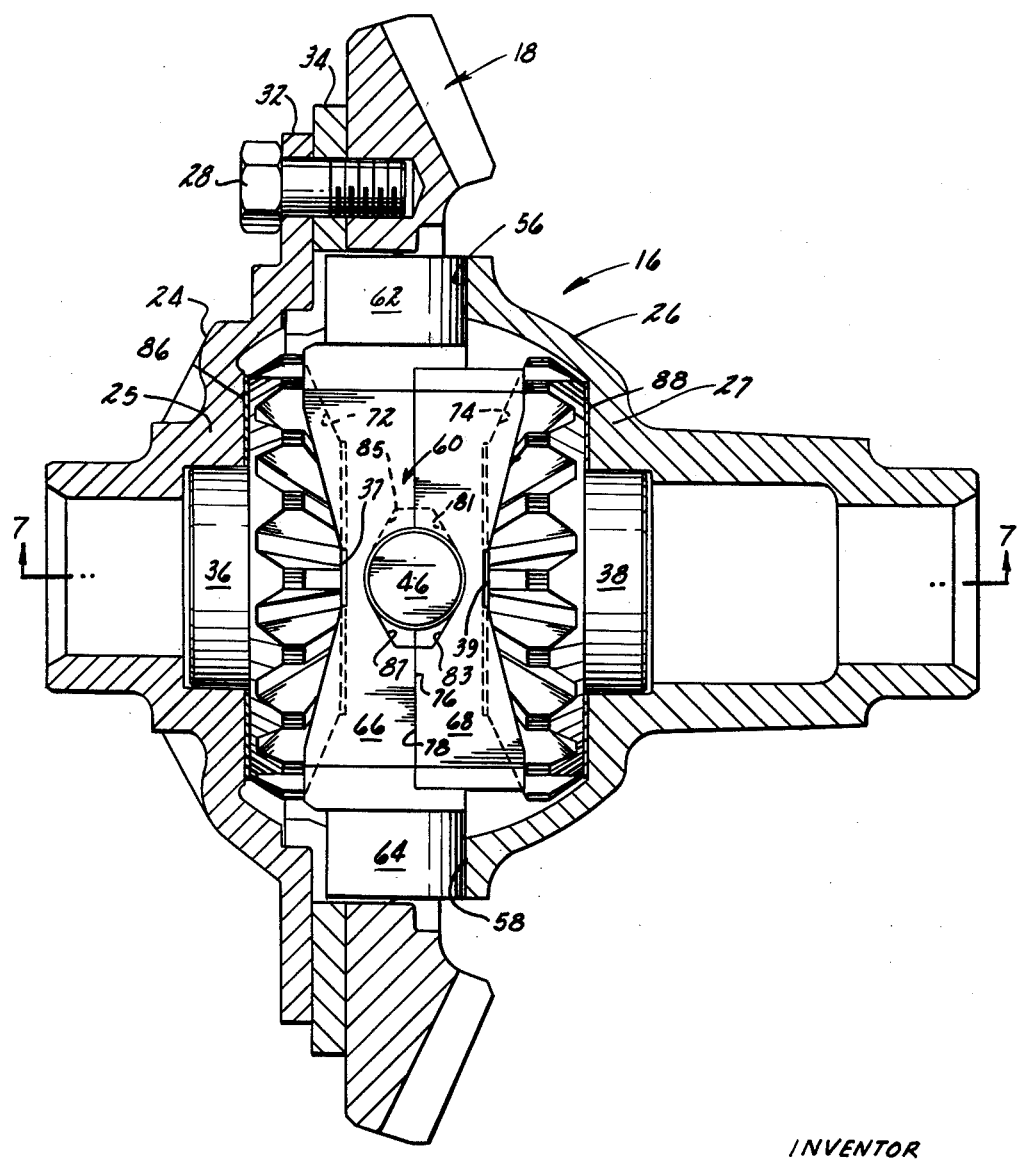

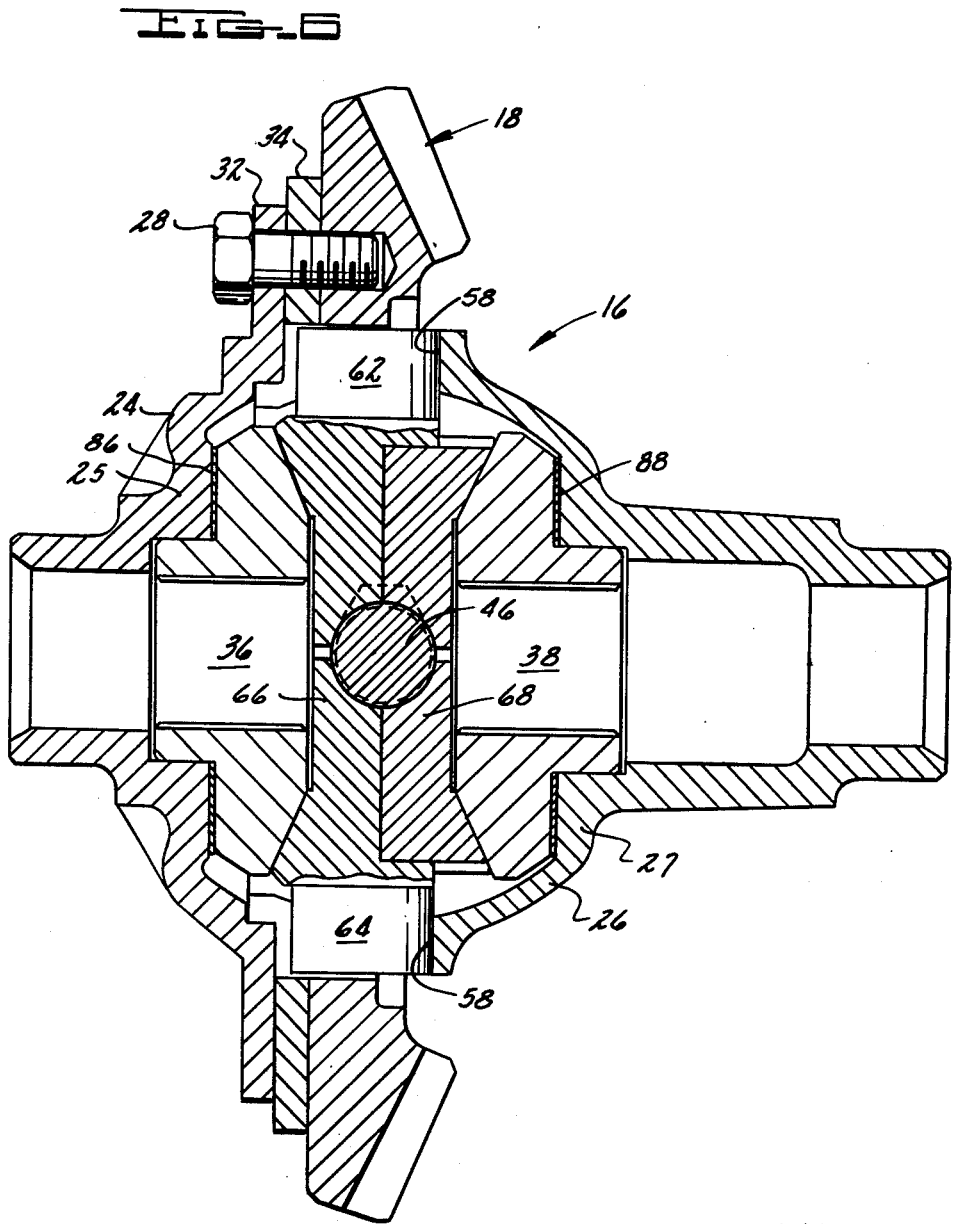

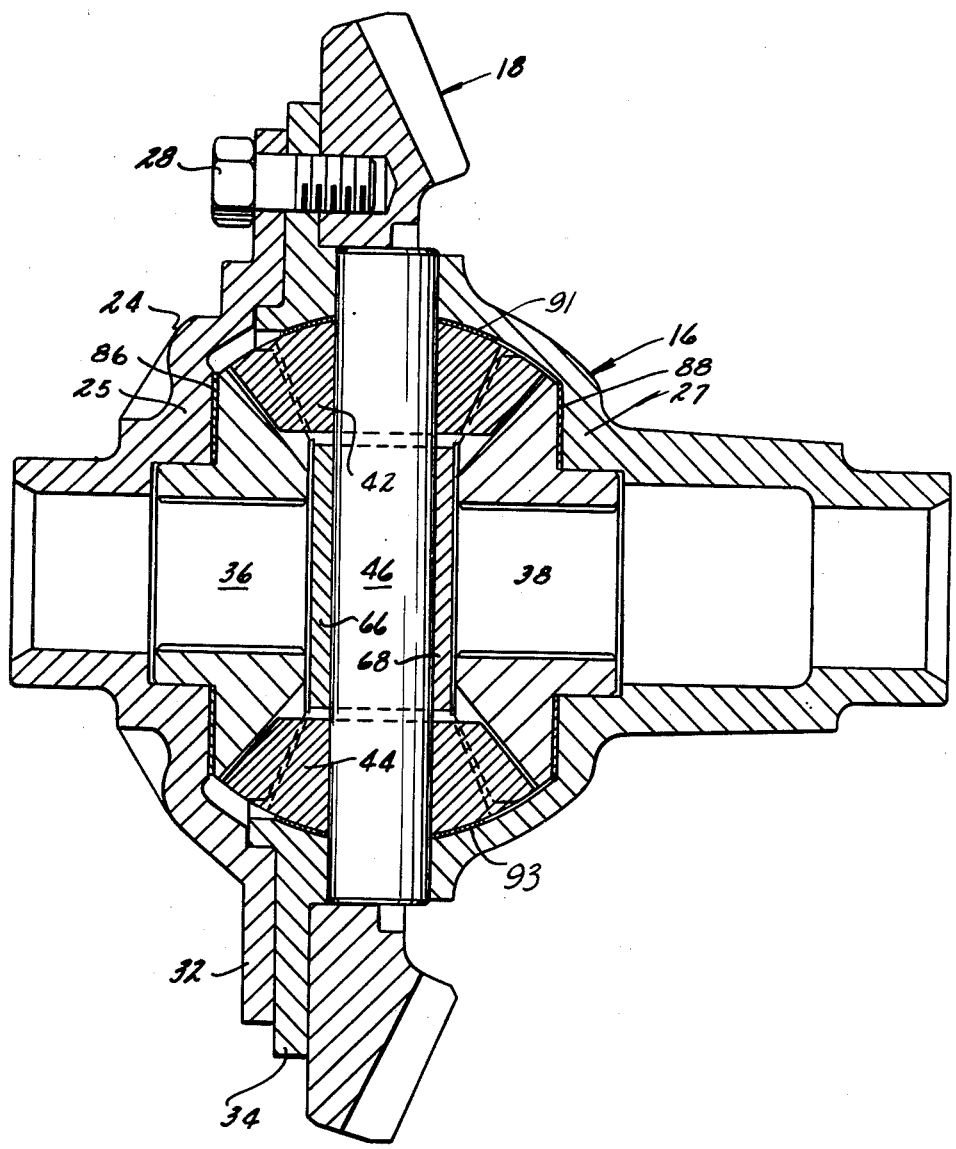

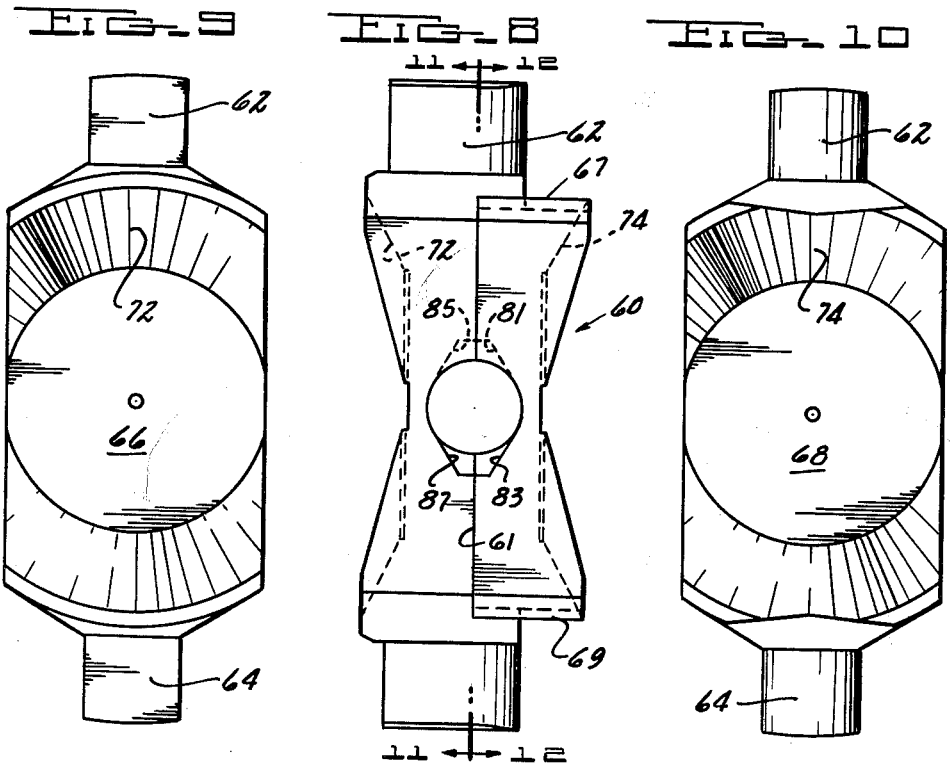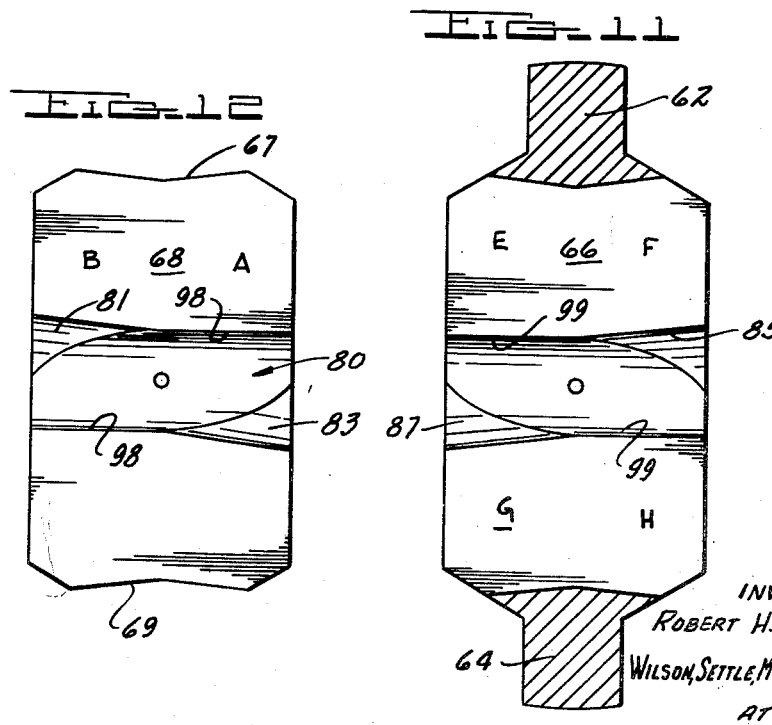

United States Patent Office 3,131,578
Patented May 5, 1964

3,131,578
LOCKING DIFFERENTIAL
Robert H. Elliott, 19489 Strathmoor, Detroit 35, Mich.
Filed Sept. 2, 1960, Ser. No. 53,642
13 Claims. (Cl. 74—710.5)

The present invention relates to a differential power transmission and more particularly to a mechanical type locking differential.

In a conventional automotive differential having an engine-driven differential case driving pinion gears through a case-mounted pinion gear pin, the pinion gears meshing with wheel-connected side gears, engine torque drives the case for equal torque transfer thru the pinion and side gears to the driving wheels. If one of the side gears is free to turn relative to the other side gear, then all of the engine torque will be delivered to the free side gear and no effective driving force will be exerted on the other side gear or the wheel connected thereto. For this reason, if one of the driving wheels is on ice, snow or mud without substantial frictional engagement with the road surface, the one wheel is relatively free and no effective vehicular drive can be obtained.

Previously proposed "locking differentials" have commonly utilized cams, friction discs or locking pawls to prevent effective differential action. Unfortunately, such proposed devices materially interfere with the normal differential function which is essential to proper steering. If turning a corner is attempted with the differential locked, either ineffective steering will result or relative differential gear-locking element movement, with consequent wear, must occur. In some locking differentials, unlocking during cornering or steering is attempted, but the mechanism merely locks in the opposite rotative direction. Consequently, the life expectancy of all existing locking differentials now commercially available is very limited.

Further, such locking mechanisms are complicated and far-from-foolproof, while some hydraulic and mechanical assemblies require separate lubrication and/or actuating mechanisms.

The present invention now provides an extremely simple, inexpensive locking mechanism for an automotive differential which utilizes the conventional and presently necessary differential components, and also the relative motion within the differential assembly to actuate the locking mechanism, which prevents relative movement between the wheel-connected side gears when locked, and permits differential operation, as when turning. The resultant operational advantages of insured traction at both driving wheels at all times, of easy cornering without excessive internal differential friction or external tire drag and of utilizing the conventional differential lubrication system will be readily appreciated.

Structurally, the present invention generally comprises a pair of locking members interposed between the side gears and movable into and out of frictional engagement therewith. The members are moved by relative pinion gear-case movement accommodated by an elongated case slot within which the locking members are movable upon the transmission of driving torque through the differential in either direction, but not in both directions. Preferably, the members are moved to their locking positions upon the transmission of torque from the engine thru the differential in a direction such as to impart forward movement to the vehicle, and are moved to their unlocking positions upon the reverse transmission of torque therethru as occurs when the wheels are driven from the road-tire friction, this is commonly referred to as "reversion torque" as distinct from "driving torque" or "engine torque." There is no functional or structural reason why the members could not be moved to their locking positions upon movement of the vehicle in reverse, if such operation were desired.

During cornering, the outside wheel, of course, travels further than the inside wheel and, so far as the differential is concerned, the wheels are relatively turning in opposite directions. Although both side gears are driven by the engine, the inner wheel and its side gear are driven in one direction, while the outside wheel side gear drives the pinion gears in relatively the reverse direction. As a result, the locking members of this invention slip in accordance with the load applied during cornering and self-locking when cornering is completed and the vehicle moves in a straight, forward direction.

Most of the locking differentials heretofore developed have had substantial difficulty in preforming the normal differential function when the vehicle is moving around a corner or curve. This difficulty occurs because of the tendency of the locking differential to completely lock as the device performs its differential function under power.

It is therefore a principal object of the present invention to provide a locking differential which is simple, durable and of such design as to be economically manufactured and adapted for universal usage with conventional axle assemblies currently in production.

It is another object of the present invention to provide a locking differential which locks in one direction only and wherein predetermined slippage is permitted when the differential function is required under full power.

Another object of the invention is the provision of a locking differential power transmission means which will provide safety and stability during high speed driving, as well as preventing wheel spin due to wheel bounce over rough, non-uniform roads spotted with ice, snow, sand or gravel.

Another object of the present invention is the provision of a locking differential power transmission means which can be installed in the axle of both new and old vehicles alike, without substantial modification of the existing differential parts.

Another object of the invention is the provision of a mechanical locking type differential which will perform quietly and efficiently, while requiring little or no maintenance during the life of the vehicle.

Still another object of the present invention is the provision of a mechanical locking type differential where the locking efficiency can be regulated in accordance with the manufacturer's specification, without major modification of the production tooling.

Still another object of this invention is the provision of a mechanical locking differential which uses standard differential lubrication, thereby eliminating the specialized lubrication service problem which currently exists.

Therefore, a good locking differential must lock as the need arises, while permitting normal differential action under power. It must prevent the transfer of shock loads to a single axle, while still providing sufficient driving torque to the wheel having traction. The locking differential must not interfere with steering and it must be quiet in operation. It must be of durable construction and operable regardless of the amount of wear, although inexpensive and interchangeable with existing axle assemblies and differential cases currently in production. And last, it must provide increased safety and improved stability of handling under all adverse conditions involving poor traction.

These and other objects can be obtained by the provision of a locking differential power transmission having a differential carrier adapted to be positioned in an axle housing; a rotatable drive pinion in said carrier; a differential assembly in said carrier, comprising a circular differential case; a ring gear positioned on said differential case in toothed engagement with said drive pinion; a pair of side gears in said differential case adapted for driving connection with a pair of axle shafts, a pair of pinion gears in toothed engagement with said side gears, and means for positioning said differential pinion gears, said differential case having a pair of slots in the periphery thereof; a locking member interposed between said side gears, said locking member spanning the differential case perpendicularly to the rotational axis thereof and having its ends slidably disposed in said slots; said locking member having an inclined cam face extending in one direction; rotation of said differential assembly displacing said differential pinion gears for movement of said cam face, the relative movement holding said locking member into engagement with said side gears to oppose rotation thereof with respect to said differential case, said case and said side gears thus being co-rotatable to prevent effective differential action in said differential assembly.

Other objects of this invention will appear in the following description and appended claims, reference being had to the accompanying drawings forming a part of this specification wherein like reference characters designate corresponding parts in the several views.

In the drawings:

FIGURE 1 illustrates the substantially horizontal cross section of a standard differential carrier assembly.

FIGURE 2 illustrates an enlarged elevational view of the standard differential case illustrated in FIGURE 1, rotated 90° and with the present invention installed therein.

FIGURE 3 is a view taken substantially in the direction of arrows 3—3 of FIGURE 2.

FIGURE 4 is an elevational view of one section of the differential case taken substantially in the direction of arrows 4—4 of FIGURE 2.

FIGURE 5 is a cross sectional view taken along lines 5—5 of FIGURE 4, showing a standard differential case with the present invention positioned therein, the side gears and locking mechanism being shown in elevation for clarity.

FIGURE 6 is a true cross sectional view taken in a similar manner to that of FIGURE 5.

FIGURE 7 is a cross sectional view taken substantially along lines 7—7 of FIGURE 5 with portions shown in elevation.

FIGURE 8 is an elevational view of the locking member used in the present invention.

FIGURE 9 is a left side elevation of the locking member shown in FIGURE 8.

FIGURE 10 is a right side elevation of the locking member shown in FIGURE 8.

FIGURE 11 is a cross sectional view taken along the centerline of the locking member in the direction of arrows 11—11 of FIGURE 8.

FIGURE 12 is a cross sectional view taken along the centerline of the locking member in the direction of arrows 12—12 of FIGURE 8.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIGURE 1 illustrates a conventional drive assembly 10, comprising a differential carrier 12, a drive pinion 14 adapted to be driven with a power source (not shown) and a rotatable differential assembly 16, with a ring gear 18 secured thereto for driving engagement with the drive pinion 14.

The differential case assembly 22 is formed of two separable sections 24 and 26. The ring gear 18 is affixed to the differential case flanges 32 and 34 with a plurality of bolts 28, which extend therethrough. When the drive pinion 14 is rotated, the ring gear 18 is rotated and the differential assembly 16 carried thereby is caused to be rotated so as to drive a vehicle.

Within the differential case assembly 22 are two side gears 36 and 38 mounted on the rotational axis thereof. In mesh with the two side gears 36 and 38 are two pinion gears 42 and 44 which are rotatably mounted on a differential pinion shaft or pin 46 which extends diametrically through the differential case. Each of the side gears 36 and 38 is cooperable to receive and drive an axle shaft which is coupled thereto. It will be readily apparent that the above briefly described structure is nothing more or less than a standard or otherwise termed conventional differential mechanism.

However, FIGURE 2 of the drawings illustrates an enlarged elevational view of the standard differential assembly 16 shown in FIGURE 1, rotated 90° and modified slightly to receive the locking device of the present invention. It will be noted that openings 52 and 54 in the differential case section 26 in which the pinion pin 46 is located, has now been elongated, as opposed to the round openings which were formerly found therein. Additionally, two axially extending slots 56 and 58 in the periphery of the case have been added. These slots can best be viewed in FIGURES 2 and 3 of the drawings. The above described openings 52, 54, 56 and 58 are positioned in the periphery of the differential case section 26 in spaced relationship to each other, while being diametrically opposed. As in the standard differential case, the pinion pin 46 extends diametrically through the case section 26 perpendicularly to the rotational axis thereof and through the elongated openings 52 and 54, while the outer ends 62 and 64 of the locking assembly 60 extend through the axial slots 56 and 58.

FIGURE 5 of the drawings, taken along lines 5—5 of FIGURE 4 best illustrates the locking assembly 60 in a differential housing while FIGURES 8–12 illustrate the details thereof. The pinion pin 46 is shown in the same relative position as it is shown in FIGURE 2 of the drawings, and the outer ends 62 and 64 of the locking assembly 60 are slidably positioned in the axially positioned case slots 56 and 58. The body of the locking assembly is generally rectangular in configuration and disposed intermediate each of the side gears 38 and 36 and between the pinion gears 42 and 44.

The locking assembly 60 in the preferred form of the present invention is of two-part construction and separable substantially along the centerline 61 thereof. Each of the outer faces 72 and 74 of the locking members 66 and 68 are of concave configuration and adapted to engage the toothed faces of each of the side gears 36 and 38. The inner, generally flat faces 76 and 78 of each of the locking members 66 and 68 have a pair of inclined cam surfaces 80 thereon, cooperable with the central portion of the body of the pinion pin 46 so as to displace said locking members into engagement with the side gears proper upon displacement thereof. This function will be more fully described subsequently.

Referring to FIGURE 4 of the drawings, the relative location of the pinion gears 42 and 44 with respect to the locking member 68 is illustrated. In this view, it will be noted that the two inclined cam surfaces 81 and 83 in locking member 68 are located in two opposite quadrants, namely B and D with stop means 98 being provided in quadrants A and C. The two inclined cam surfaces 85 and 87 in locking member 66 are positioned adjacent thereto and are located in quadrants F and G (FIGURE 11) with stop means 99 being formed in quadrants E and H. It will be noted that the same cam surfaces permit movement of the pinion pin 46 in one direction only and consequently locking will occur as a result of relative movement of the pin to the case in one direction only.

From FIGURE 4, it will be noted that the ends 45 and 47 of differential pinion pin 46 extend through the elongated openings 52 and 54 in the differential case section 26, and that the differential pinion pin 46 is in engagement with stops 53 and 98 on one side of the locking member and case and in contact with stops 55 and 98 on the other side of the locking member and case. It will be noted in FIGURES 4, 10, 11 and 12 that one of the locking members 68 is keyed to locking member 66 by the formation of a cutaway section on the top 67 and bottom 69 thereof respectively, while the locking member 66 is undercut in a similar manner to cooperate therewith. This structure provides a means for readily aligning the locking members 66 and 68 while providing a guide or key on which the members can be displaced to operate when the differential pinion 46 is caused to be moved.

The side gears 36 and 38 are positioned along the rotational axis of the differential case sections 24 and 26 and are held against axial displacement by the end portions 25 and 27 of the case. Positioned intermediate the side gear 36 and the end of case 25 is a generally flat washer 86, preferably from some material other than from which the case and side gears are manufactured. A similar washer 88 is positioned intermediate the side gears 38 and the end 27 of case 26 while dished washers 91 and 93 are provided intermediate the pinion gears 42 and 44 and differential case section 26.

*Operation*

When starting from a standing position, the drive pinion is caused to be rotated, which in turn rotates the differential case assembly 16. As the differential case assembly 16 is rotated, the differential pinion pin 46 is caused to be moved against the inclined cam surfaces 81, 83, 85 and 87 since the wheels of the vehicle are on the ground. As the differential pinion pin 46 moves up the inclined cam surfaces 81, 83, 85 and 87 the locking members 66 and 68 are displaced to the left and right, respectively. Since the side gears 36 and 38 are held against axial displacement, the locking members jam said side gears with a vise-like action to prevent rotation with respect to the differential case proper. Under these conditions, the torque is effectively distributed to both wheels. As a result, one wheel cannot spin relative to the other, so that there is no driving problem when one wheel is obstructed, or when one wheel is on a slippery surface. When the vehicle is driven in reverse, the pinion pin 46 is caused to be moved against the stops 98 and 99 in the locking members and against stops 53 and 55 in the differential case section 26 and no locking action occurs.

The positioning of the cams 80 in the locking assembly 60 so as to operate in one direction only is intentional and by so doing it makes possible the elimination of objectionable noises, currently found in the locking differentials, while it also eliminates excessive wear on all of the differential components as a result of the driving torque tending to lock the differential during coasting. In the present invention, no such action occurs and when differential action is required, it is positive and automatic.

While the present invention has been described having a pin extending through the differential case for positioning the pinion gears, they may of course be mounted on a stub shaft, the stub shaft being a shortened pinion pin, or it may extend from one of the locking members. If this structure is used, the cam surfaces on the locking members would extend outwardly from the inner faces thereof between the locking members. As the ring gear rotates the differential assembly, the locking members would then be caused to be displaced and thereby lock the side gears to the case. The displacement of the ends 62 and 64 of the locking members mounted in the slots 56 and 58 in the case would provide for the transfer of torque. It must be remembered however, that to provide an effective and long wearing locking differential, the cam surfaces must be so positioned as to provide for a lock in one direction only.

From the foregoing description, it will be apparent to one skilled in the art that the above described invention is simple, durable and inexpensive and that by using a locking device having cam faces extending in one direction only, objectionable noises can be eliminated and the life expectancy substantially increased.

Having thus described my invention, I claim:

1. In a mechanical locking differential for use with a power source, the combination of, a differential carrier adapted to be positioned in an axle housing; a generally circular differential case rotatably positioned in said carrier; a pair of side gears in said differential case; a pair of differential pinion gears rotatably mounted in toothed engagement with said side gears in said differential case; a two piece locking member positioned between said side gears and said pinion gears; a round differential pinion gear shaft; a pair of longitudinal slots in said differential case; the ends of one of said locking members being slidably disposed in each of said longitudinal slots; radial cam means in the inner face of each of said locking members, the body of said differential pinion shaft being in tangential contact with said cam means; the body of the pinion gear shaft when rotated in a plane perpendicular to the rotational axis of the side gears being operable to spread the two piece locking member into engagement with the face of each of said side gears and thereby to limit the relative rotation thereof with respect to said differential case.

2. In a mechanical locking differential for use with a power source, the combination of, a differential carrier; a circular differential case rotatably positioned in said carrier; a pair of side gears and differential pinion gears in said differential case; a shaft supporting said differential pinion gears for rotation, the shaft extending through a pair of substantially radial slots in the periphery of said differential case, said slots accommodating case-shaft relative movement; a movable locking member disposed about said pinion gear shaft between said side gears and said differential pinion gears; the outer ends of said movable locking member being slidably positioned in a second pair of slots in the periphery of said case and displaced at substantially right angles to said first openings; radial camming surfaces on said movable locking member engageable with said differential pinion gear shaft intermediate said pinion gears thereon; movement of said differential pinion gear shaft in said first pair of slots moving said locking member into engagement with said side gears to oppose the relative rotation of said side gears with respect to said differential case.

3. In a mechanical locking type differential for use with a power source, the combination of, a differential carrier; a drive pinion in said carrier; a differential assembly in said carrier; a generally spherical differential case having a plurality of slots in the periphery thereof, a ring gear positioned on said differential case in toothed engagement with said drive pinion; a pair of side gears in said differential case for driving connection with a pair of axle shafts; a pair of pinion gears in toothed engagement with said side gears, and a differential pinion pin extending through said differential pinions; a pair of locking members between said side gears and said pinion gears; the ends of said locking members slidably disposed in at least two slots positioned along the rotational axis of said differential case; cam means on one face of each of said locking members adjacent said differential pinion pin; rotation of said differential assembly with said power source displacing said differential pinion pin in a plane perpendicular to the rotational axis of said differential case for movement relative to said cam means thereby moving said locking members into engagement with said side gears to oppose the rotation thereof with respect to said differential case, said case and differential gears co-rotatable prevent differential action, while permitting differential action when required or when said differential pinion pin is displaced in the opposite direction.

4. In a conventional automotive differential assembly including a rotatable gear case, peripherally enclosing opposed side gears and opposed pinion gears, the pinion gears being mounted on a pin spanning the case intermediate the side gears, the improvements of a locking member lying substantially normal to the pin and guided by the case for movement toward and away from the side gears, means accommodating relative pin-case movement peripherally of the case, and cooperable cam surfaces on said pin and said locking member for urging the locking member into frictional surface engagement with the side gears upon relative case-pin movement.

5. In a mechanical locking differential for use with a power source, the combination of a differential carrier; a generally spherical differential case rotatably positioned in said carrier; side gears rotatably mounted in said differential case; pinion gears rotatably mounted on a movable shaft which extends across said differential case; a pair of locking members positioned around said movable shaft between said side gears and said differential pinion gears; cam means on each of said locking members adjacent said pinion gear shaft; displacement of said pinion gear shaft in one direction and in a plane perpendicular to the rotational axis of said side gears actuating said cam means to displace said locking members into engagement with said gears, thereby limiting rotation of said gears with respect to said differential case, while rotation of said shaft in the opposite direction permits normal differential action.

6. In a differential power transmission for use with a power source, the combination of, a differential carrier positioned in an axle housing; a circular differential case rotatably positioned in said carrier; two side gears in said differential case; two differential pinion gears in toothed engagement with said side gears; said differential pinion gears being rotatably mounted in spaced relation on a differential pinion gear shaft; a movable locking member having radially disposed cam means on one face thereof adjacent said side gears and between said differential pinion gears; said differential pinion gear shaft contacting said radial cam means on said movable locking member; rotational displacement of said pinion gear shaft and gears in a plane perpendicular to the rotational axis of said side gears moving said locking member into engagement with at least one of said side gears to limit relative rotation thereof with respect to said differential case while reverse displacement of said differential pinion gear shaft and gears releases said locking members to provide differential action when required.

7. In a mechanical locking differential for use with a power source, the combination of, a circular differential case; means supporting said case for rotation; a pair of spaced side gears rotatably positioned inside said differential case; a pair of spaced differential pinion gears; a pinion gear shaft supporting said differential pinion gears for rotation; a movable locking member between said side gears and said differential pinion gears; cam means on said locking member; said cam means cooperable with said pinion gear shaft, pivotal displacement of said shaft in one direction displacing said movable locking member to effect co-rotation of said gears and said differential case, while displacement of said shaft in the opposite direction permits normal differential action by accommodating relative gear-case rotation.

8. In a mechanical locking differential for use with a power source, the combination of, a differential carrier; a drive pinion in said differential carrier; a differential assembly in said carrier comprising, a ring gear positioned on said differential assembly in toothed engagement with said drive pinion, a differential case, a pair of side gears rotatably positioned in said differential case, a pair of pinion gears in toothed engagement with said side gears, a round differential pinion pin extending through said pinion gears; a first locking member positioned about the differential pinion pin intermediate the side gears with a second locking member positioned in alignment with said first locking member; the ends of the first of said locking members slidably positioned in a pair of openings in said differential case along the rotational axis thereof; cam means on each of said locking members adapted to cooperate with said round pinion pin; rotation of said round pinion pin within a plane perpendicular to the rotational axis of the differential case displacing each of said locking members to engage the face of each of said side gears to rotate both side gears in unison with the differential case.

9. In a locking type differential power transmission for use with a power source, the combination of, a differential carrier positioned in an axle housing; a generally circular differential case rotatably positioned in said carrier; a pair of side gears and differential pinion gears rotatably positioned in said differential case; a pair of movable locking members; each of said locking members having a conical outer face adapted to engage the outer face of each of said side gears; a radially movable differential pinion gear shaft for rotatably positioned said differential pinion gears in a plane perpendicular to the rotational axis of said differential case; an inclined cam surface on the inner faces of each of said locking members and cooperable with said differential pinion gear shaft; stop means for limiting radial rotation of said differential pinion gear shaft and displacement of differential pinion gears; radial movement of said pinion gear shaft in one direction displacing said locking members relative to said cam faces, into engagement with the conical faces of each of said side gears to limit the rotation thereof with respect to said differential case, while rotation of said differential pinion gear shaft in the opposite direction against said stop means permits normal differential action.

10. In a mechanical locking differential for use with a power source, the combination of, a differential carrier, a differential assembly in said carrier comprising a differential case, a pair of side gears rotatably positioned in said differential case, a pair of pinion gears in toothed engagement with said side gears, a differential pinion shaft extending through said differential pinion gears; a locking member positioned intermediate the side gears; cam means on said locking member adapted to cooperate with the body of said pinion shaft; stop means on said locking member for limiting rotation of said pinion shaft; rotation of said pinion shaft in a plane perpendicular to the rotational axis of said differential case and with respect to said cam means displacing said locking member to engage said side gears, thereby rotating both side gears with the differential case.

11. In a mechanical locking type differential for use with a power source, the combination of, a differential carrier; a drive pinion in said carrier; a differential assembly in said carrier, comprising a circular differential case having a first pair of opposing radial slots in the periphery thereof, a ring gear positioned on said differential case in toothed engagement with said drive pinion, a pair of side gears in said differential case adapted for driving connection with a pair of axle shafts, respectively, a pair of pinion gears in toothed engagement with said side gears, and a differential pinion pin extending through said differential pinion gears and the radial slots in said differential case; said differential case also having a second pair of radial slots peripherally displaced from said first slots; a locking member interposed between said side gears and said pinion gears, said locking member spanning the differential case and having its ends slidably disposed in said second slots, respectively, said locking member having an inclined cam face adjacent said differential pinion pin; rotation of said differential assembly displacing said differential pinion pin in said first pair of slots for movement relative to said cam face, relative pin-face movement moving said locking member into engagement with said side gears to oppose the rotation thereof with respect to said differential case, said case and said side gears thus being co-rotatable to prevent effective differential action in said differential assembly.

12. In a mechanical locking differential for use with a power source, the combination of, a differential carrier positioned in an axle housing; a differential case rotatably mounted in said carrier; a first pair of gears rotatably positioned in said differential case; a second pair of gears in mesh with said first pair of gears and rotatably mounted on a shaft extending substantially through said differential case in a plane parallel to the faces of said first pair of gears and perpendicular to the rotational axis thereof; a pair of locking members positioned around said shaft between said first pair of gears and said second pair of gears; cam means on each of said locking members adjacent said shaft; stop means for limiting movement of said shaft; rotational movement of said shaft in one direction actuating said cam means to displace said locking members into engagement with said first pair of gears with respect to said differential case and rotation of said shaft in the opposite direction permits normal differential action.

13. In a differential for an automobile movable in a forward direction and a reverse direction, including a differential case, a straight pinion pin traversing the differential case in a plane perpendicular to the rotational axis thereof and having spaced pinion gears rotatably mounted thereon, side gears in mesh with said pinion gears, the improvement of a locking element interposed between said straight pinion pin and one of the side gears; cam means on said locking element cooperable with said straight pinion pin in a plane parallel to the faces of said side gears for urging the locking element into jammed engagement with the side gear and differential case; the cam means being inclined in one direction only, so that engagement of the respective parts renders the assembly co-rotatable when the drive through the differential is from the case, through the pinion gears and side gears to move the automobile in a forward direction, but jamming engagement does not occur when the automobile is driven in the reverse direction.

References Cited in the file of this patent

UNITED STATES PATENTS 1,358,434    Ford _____ Nov. 9, 1920

FOREIGN PATENTS 788,105    Great Britain _____ Dec. 23, 1957

Notice of Adverse Decision in Interference

In Interference No. 95,293 involving Patent No. 3,131,578, R. H. Elliott, LOCKING DIFFERENTIAL, final judgment adverse to the patentee was rendered Apr. 30, 1968, as to claim 8.

[*Official Gazette October 29, 1968.*]